UNITED STATES PATENT OFFICE.

JOHN TAYLER RYAN, OF BROOKLYN, NEW YORK.

IMPROVED SILICATED LIQUID FOR THE MANUFACTURE OF SOAPS AND FOR OTHER PURPOSES.

Specification forming part of Letters Patent No. 58,303, dated September 25, 1866.

*To all whom it may concern:*

Be it known that I, JOHN TAYLER RYAN, of Brooklyn, in the county of Kings and State of New York, have invented a new and useful Improvement in the Preparation of Silicated Liquids; and I do hereby declare the following to be a full, clear, and exact description thereof.

The nature of my invention consists in the combination of vegetable gums, mucilages, &c., with the silicates of potassa, soda, (alkaline or neutral,) ammonia, alumina, or magnesia, (either separately or in combination,) for the purpose of reducing the specific gravity of said silicates and of imparting thereto greater viscidity.

I contemplate the use of all mucilaginous or gummy substances derived from the vegetable kingdom. I take, however, by preference, the mucilages which may be derived from the *Algaceæ*, (such as the *Fucus vesiculosus*, *Fucus helminthocorton*, *Fucus crispus*, *Cetraria islandica*, *Fucus serratus*, or *Fucus nodosus*,) from the natural order of *Linaceæ*, (selecting as the best the *Linum resitalissimum*,) or from the concrete juices of any species of acacia.

In extracting or preparing a mucilaginous or viscous solution from any of these vegetables or gums I do not confine myself to any particular process. They may be obtained by maceration in water, by boiling with free or close steam, or in such other manner as may be found most convenient.

In my experiments I have used a jacketed or double steam-tight vessel, provided with a central revolving shaft, to which are attached arms or blades for stirring the contents of the apparatus. Having placed the gums or vegetable matter therein, in a powdered form, I add to every one hundred pounds thereof about three hundred pounds of water, or of a weak hydrate of soda having a specific gravity of 1.015; then, having completely closed the vessel, heat its contents by means of steam introduced around the same into the jacket which incloses it, and, in the meantime, stir up the materials by means of the revolving shaft until they have imparted to the solution the required viscidity and consistency.

Having strained or otherwise cleared and purified the mucilaginous solution thus prepared, I simply mix it with any alkaline or neutral silicate, in such proportions as shall suffice to reduce the specific gravity of the silicate to the degree which is found desirable in the special purpose to which it is subsequently to be applied, and which so varies as that no definite proportions can be given.

The viscidity and body of the silicate are increased and its specific gravity reduced, more or less, according to the quantity of mucilage added thereto.

The viscid silicates thus prepared and obtained are especially valuable in the manufacture of soaps and saponaceous compounds, and for many other purposes in which a pure silicate cannot now be advantageously employed.

In preparing the mucilaginous solutions for admixture with the silicates, the gums or mucilages of different plants may, in some cases, be advantageously combined.

Although I do not claim as my invention glutinous or gelatinous substances, such as are obtained from animal matter, in combination with silicates, still I claim as new the combination of such glutinous or gelatinous substances with those hereinbefore specified, which are in themselves free from animal gelatin, to obtain a viscous liquid for the treatment of silicates, as herein described.

Having thus fully described the nature of my invention in the improvement of silicates for certain purposes, and the manner of effecting the same, what I claim therein as new, and desire to secure by Letters Patent, is—

1. The combination of any vegetable gummy or mucilaginous substance or solution with any one or more of the silicates of potassa, soda, (neutral or alkaline,) ammonia, alumina, or magnesia, substantially in the manner and for the purpose herein set forth.

2. The combination of animal gluten with vegetable mucilages or gums, and with the silicates of potassa, soda, ammonia, alumina, or magnesia, substantially in the manner and for the purpose herein set forth.

This specification of my improvement in silicated liquids signed be me this 3d day of March, A. D. 1866.

JOHN T. RYAN.

In presence of—
F. W. TABER,
GEO. A. MAYHEW.